United States Patent [19]

Hill et al.

[11] 4,246,375

[45] Jan. 20, 1981

[54] VULCANIZATION PROCESS AND COMPOSITIONS FOR USE THEREIN

[75] Inventors: Peter Hill, Rochdale; Jack Thompson, Oldham, both of England

[73] Assignee: Vulnax International Limited, London, England

[21] Appl. No.: 106,510

[22] Filed: Dec. 26, 1979

[30] Foreign Application Priority Data

Mar. 1, 1979 [GB] United Kingdom ............... 07360/79

[51] Int. Cl.$^3$ ............................................. C08L 91/00
[52] U.S. Cl. ............................... 525/341; 260/23.7 H
[58] Field of Search ................... 525/341; 260/23.7 H

[56] References Cited

U.S. PATENT DOCUMENTS

| | | | |
|---|---|---|---|
| 3,400,106 | 9/1968 | Morita | 525/341 |
| 3,458,461 | 7/1969 | Mihal | 260/23.7 H |
| 3,810,856 | 5/1974 | Dalhuisen et al. | 263/23.7 H |

FOREIGN PATENT DOCUMENTS

| | | | |
|---|---|---|---|
| 682877 | 3/1964 | Canada | 260/23.7 H |
| 858136 | 4/1961 | United Kingdom | 525/341 |
| 1491110 | 11/1977 | United Kingdom . | |

*Primary Examiner*—William F. Hamrock
*Attorney, Agent, or Firm*—Cushman, Darby & Cushman

[57] ABSTRACT

The use of $C_{10}$ to $C_{14}$ alkanoic acids, especially lauric acid, as a processing aid in the vulcanization of polychloroprene rubbers by heating in the presence of magnesium oxide, zinc oxide and thiophosphoric-N,N',N"-trimethyltriamide. Also the manufacture of pre-formed mixtures of the acid and the amide in the ratio of 0.5:1 to 2:1 for use in this process.

The use of these acids overcome the technical problem of blooming on storage which is obtained when the more usual stearic acid is used in the process.

5 Claims, No Drawings

VULCANIZATION PROCESS AND COMPOSITIONS FOR USE THEREIN

This invention relates to a new vulcanisation process and to compositions for use therein. More particularly, the invention relates to a new and improved process for vulcanisation of polychloroprene rubbers and to an accelerator composition for use therein.

U.K. Pat. No. 1,491,110 describes the use of N,N',N"-tri $C_1$–$C_2$ alkyl thiophosphoric triamides as accelerators for the vulcanisation of polychloroprene rubbers using zinc oxide and magnesium oxide as vulcanising agents, and states that other conventional additives for polychloroprene rubbers can be present in the mixture. One such additive which is named is stearic acid, which is conventionally added to vulcanisation mixes of polychloroprene rubbers since it is believed to increase processing safety, to assist the mixing-in of the other additives and to minimise sticking of compound to mill and calender rolls.

However, further experience of the vulcanisation of polychloroprene rubbers with the preferred accelerator, thiophosphoric N,N',N"-trimethylamide has shown that when this is effected in the presence of stearic acid, a white bloom can form on the surface of the vulcanised rubber and mar its appearance. It has now been found, however, that $C_{10}$–$C_{14}$ alkanoic acids can effectively take the place of stearic acid without giving rise to the bloom.

Thus the present invention in one aspect provides a process for the vulcanisation of polychloroprene rubbers by heating in the presence of magnesium oxide, zinc oxide and thiophosphoric-N,N',N"-trimethyltriamide, wherein as processing aid, there is added a small amount of a $C_{10}$–$C_{14}$ alkanoic acid to the unvulcanised polychloroprene rubber.

The preferred alkanoic acids are the $C_{10}$–$C_{12}$ acids, above all, lauric acid.

As described in U.K. Pat. No. 1,491,110, other conventional additives can be added to the polychloroprene rubber e.g. carbon black, china clay, pigments, processing oils, retarders, other elastomers, antioxidants and antiozonants. Cellular and microcellular products can be obtained by incorporating blowing agents, e.g. dinitrosopentamethylene tetramine, azodicarbonamide, benzene sulphonyl hydrazide, into the mixture. In some of these cases, in contrast to the normal 0.5–1% by weight of stearic acid, based on the rubber, used in vulcanising non-cellular polychloroprene, it is common to use 4–5% by weight of stearic acid. Therefore, in such cases, the present invention contemplates the use of a mixture of a $C_{10}$–$C_{14}$ alkanoic acid with stearic acid as a blowing agent activator, since the presence of surface bloom is less important in the case of cellular rubbers.

In preparing the vulcanisation mix, the zinc and magnesium oxides may be used in conventional amount, which may conveniently be from 1% to 10% by weight of the uncured polychloroprene rubber. The thiophosphoric-N,N',N"-trimethyltriamide will normally be used in an amount from 0.1% to 5%, preferably from 0.25% to 1.5%, by weight of the uncured polychloroprene rubber. The alkanoic acid of $C_{10}$–$C_{14}$ is preferably used in an amount of 0.25 part to 2 parts by weight per part by weight of the thiophosphoric-N,N',N-trimethyltriamide.

The oxides, accelerator, alkanoic acid and any other additives may be incorporated into the uncured polychloroprene rubber by any conventional manner, e.g. by use of a two-roll rubber mill, an internal mixer, e.g. a "Banbury", or a dough mixer; the mixture can be shaped by any conventional process, e.g. extrusion, calendering, press-moulding or spreading. Vulcanisation may be carried out at any suitable temperature, e.g. from 50° C. to 300° C., and preferably from 100° C. to 200° C., but temperatures outside this range may be used if desired.

A potential disadvantage of the new process arises from the fact that $C_{10}$–$C_{14}$ alkanoic acids are chemicals not normally used in the rubber processing industry and a special supply would have to be arranged by the processor.

To overcome this potential disadvantage, we propose that the accelerator and the acid be added to the unvulcanised rubber in the form of an intimate mixture comprising 0.5 part to 2.0 parts by weight of the acid per part by weight of the accelerator. Preferably the mixture takes the form of pellets which are substantially spherical or cylindrical in shape, having maximum and minimum dimensions in the range 5 mm to 1 mm. Pellets of this kind can readily be obtained by forming a uniform suspension of the accelerator in the acid at a temperature sufficient to cause the latter to liquify, and forming the resultant pasty or liquid suspension into solid spheres or cylinders of the desired shape or size by methods well known per se. Thus, pellets or particles consisting essentially of a mixture of a $C_{10}$–$C_{14}$ alkanoic acid and thiophosphoric-N,N',N"-trimethyltriamide in a weight ratio from 0.5:1 to 2:1 form a further feature of the invention.

The invention is illustrated by the following Examples in which parts and percentages are by weight.

EXAMPLE 1

A polychloroprene compound containing lauric acid and thiophosphoric-N,N',N"-trimethyltriamide was mixed in three stages.

1. The following ingredients were mixed, in a 4½ minute cycle, in a laboratory, model B, Banbury.

|  | gm |
| --- | --- |
| Neoprene WRT | 1000 |
| Magnesium oxide dispersion (approx. 80% strength) | 40 |
| N990 carbon black | 500 |

2. The batch from stage 1 was transferred to a cool 12 inch laboratory 2-roll mill and 50 gm zinc oxide were blended into it to complete the masterbatch.

3. To complete the compound, 0.5 g lauric acid were blended into 159 g masterbatch on a cool 9 inch laboratory 2-roll mill followed by 0.5 g thiophosphoric-N,N',N"-trimethyltriamide. The compound was refined by rolling it and passing it endwise ten times through a 0.5 mm nip.

Test specimens were vulcanised by moulding in a hydraulic press for 30 minutes at 153° C. Testing was carried out according to BS 903 and the following results were obtained.

| | |
| --- | --- |
| Mooney scorch time at 110° C. (min. to minimum + 10 value) | 18 |
| Rheometer at 153° C. (micro die, | |

|  |  |
|---|---|
| 60' motor, 30 sec preheat, ± 3° arc) |  |
| Time to 90% crosslinking (min) | 40 |
| Torque at 90% crosslinking (in.lb.) | 88 |
| Tensile strength (kgf/cm$^2$) | 129 |
| Elongation at Break (%) | 395 |
| Modulus at 300% elongation (kgf/cm$^2$) | 107 |
| Compression set (70° C., 24 hrs, 25% compression) | 11% |
| Compression set (100° C., 24 hrs, 25% compression) | 48% |

Vulcanised polychloroprene rubber sheet obtained as described above was stored at laboratory ambient temperature (20°–25° C.). It was inspected at intervals and was free from bloom after two months. In contrast, sheet prepared in an identical manner, but using stearic acid in place of the lauric acid, exhibited a white bloom after storage for two weeks under the same conditions.

EXAMPLE 2A

A blend of 10 gm lauric acid with 10 gm thiophosphoric-N,N',N''-trimethyltriamide was prepared by melting the acid in a 100 ml pyrex beaker at approx. 45° C. and stirring in the powdered triamide. The blend was cast into sheet by pouring it on to cold aluminium foil and rough flakes were prepared by breaking up the cold cast sheet.

EXAMPLE 2B

A blend of 10 gm lauric acid with 10 gm thiophosphoric-N,N',N''-trimethyltriamide was prepared by melting the triamide in a 100 ml pyrex beaker at approx. 105° C., then melting in the acid with stirring. The blend was cast into sheet as above.

The crude flakes from both the above blends were tested in rubber alongside the two ingredients added separately and identical results were obtained in tests on the vulcanised rubber sheets.

EXAMPLE 3

A dry powder blend of 100 gm lauric acid and 100 gm thiophosphoric-N,N',N''-trimethyltriamide was prepared in a Z-blade mixer. This dry blend was fed into a miniature extruder with a 12.5 mm diameter, 17 cm long screw and a die orifice of 3 mm. Rods of the blended product, approx. 3 mm diameter were obtained by holding the barrel at room temperature and heating the die to about 40° C. and could readily be cut up into pellets by a knife.

EXAMPLES 4 to 7

Using the conditions described in Example 1, vulcanised polychloroprene rubber sheets were prepared but using in place of lauric acid, 0.5 gram of the following:

| Example |  |
|---|---|
| 4 | capric acid |
| 5 | undecylic acid |
| 6 | tridecylic acid |
| 7 | myristic acid |

The rubber sheets were stored at ambient temperature and examined at intervals. All were still free from bloom after 2 months.

We claim:

1. A process for the vulcanisation of polychloroprene rubbers by heating in the presence of magnesium oxide, zinc oxide and thiophosphoric-N,N',N''-trimethyltriamide, wherein as processing aid, there is added a small amount of a $C_{10}$–$C_{14}$ alkanoic acid to the unvulcanised polychloroprene rubber.

2. A process as claimed in claim 1 wherein there is used a $C_{10}$–$C_{12}$ acid.

3. A process as claimed in claim 2 wherein there is used lauric acid.

4. A process as claimed in any of claims 1 to 3 wherein a blowing agent and stearic acid is added to the vulcanisation mix.

5. An accelerator composition for use in the process of claim 1 consisting essentially of a mixture of a $C_{10}$–$C_{14}$ alkanoic acid and thiophosphoric-N,N',N''-trimethyltriamide in a ratio of from 0.5:1 to 2:1 by weight.

* * * * *